United States Patent [19]
Wolf

[11] 4,097,185
[45] Jun. 27, 1978

[54] LUBRICATING DEVICE

[75] Inventor: Rudolf H. Wolf, Adrian, Mich.

[73] Assignee: Tecumseh Products Company, Tecumseh, Mich.

[21] Appl. No.: 722,641

[22] Filed: Sep. 13, 1976

[51] Int. Cl.² ............................................. F04B 39/02
[52] U.S. Cl. ................................... 415/88; 417/372; 417/902; 184/6.16
[58] Field of Search ....................... 417/902, 368, 372; 415/91, 88, DIG. 1; 184/6.16, 31

[56] References Cited

U.S. PATENT DOCUMENTS

| 2,419,905 | 4/1947 | Miess | 415/88 |
|---|---|---|---|
| 2,835,437 | 5/1958 | Boynton | 417/902 X |
| 3,187,994 | 6/1965 | Valbjørn | 417/372 |
| 3,285,504 | 11/1966 | Smith | 417/372 |
| 3,410,478 | 11/1968 | Geisenhauer | 417/902 X |
| 3,451,615 | 6/1969 | Hover | 417/372 |
| 3,664,461 | 5/1972 | Leffers et al. | 415/88 X |
| 3,738,773 | 6/1973 | Tinker | 415/88 X |

FOREIGN PATENT DOCUMENTS

| 1,403,974 | 11/1968 | Germany | 417/372 |

Primary Examiner—David H. Brown
Attorney, Agent, or Firm—Albert L. Jeffers; John F. Hoffman

[57] ABSTRACT

A lubricating device, especially for use with a hermetic motor compressor unit, having a vertical shaft extending downwardly into a lubricant sump, and in the lower end of which shaft is a device having an inlet in the lower end and operable as the shaft rotates for propelling the lubricant upwardly along a hollow passage in the shaft and into a channel formed in the outside of the shaft and disposed within the axial limits of the bearing which supports the shaft.

2 Claims, 4 Drawing Figures

LUBRICATING DEVICE

In sealed units, such as a hermetic motor compressor unit, the proper lubrication of bearing regions is highly critical because the regions are not accessible for lubricant supplied thereto from outside the unit.

A known arrangement for supplying lubricant to bearing regions in hermetic units of the nature referred to involves the use of a pick-up tube which has one end immersed in a lubricant sump. The tube is mounted in the shaft of the unit and exerts a pumping action on the lubricant which flows into the open lower end of the tube. The tube is effective for propelling the lubricant upwardly and, via suitable passage means in the shaft, to the bearing regions to be lubricated.

Such pick-up tubes are disclosed, for example, in U.S. Pat. Nos. 2,287,203, 3,125,184, 3,187,994, 3,194,490 and 3,410,478. The present invention is particularly concerned with an improvement in the type of pick-up tube illustrated in the patent last mentioned above.

In particular, it is an object of the present invention to improve the pumping action which is obtained by the use of a pick-up tube of the nature referred to.

A further object of the present invention is to effect an improvement in the pumping action of a pick-up tube of the nature referred to without any increase in the cost of manufacture of the pick-up tube.

BRIEF SUMMARY OF THE INVENTION

A pick-up tube according to the present invention is circular in cross section and has an upper cylindrical portion which is open and adapted for being press fitted into the end of a hollow motor shaft. The pick-up tube has a lower cylindrical portion, smaller in diameter than the upper portion, and connected therewith by a transition region which tapers outwardly in the upper direction.

The lower end of the lower portion is provided with a central inlet opening, smaller in diameter than the reduced diameter lower portion. According to the present invention, an impeller blade is provided which is disposed in the smaller diameter portion of the pick-up tube and extends substantially diametrically thereof.

The reduced diameter portion of the pick-up tube is selected so that cavitation does not occur in the lubricant flowing into the lower end of the pick-up tube and which will be set into rotation, not only by engagement thereof with the rotating pick-up tube, but also by the impeller blade.

The tapered region of the pick-up tube is at least partly below the liquid level in the lubricant sump so that fluid within the pick-up tube will flow outwardly and upwardly along the tapered region, and this action will cause the fluid to climb upwardly in the pick-up tube and out the top thereof and on upwardly through passage means provided therefor in the shaft in which the pick-up tube is mounted.

The exact nature of the present invention will become more clearly apparent upon reference to the following detailed specification taken in connection with the accompanying drawings in which.

DETAILED DESCRIPTION OF THE INVENTION

Figure 1:
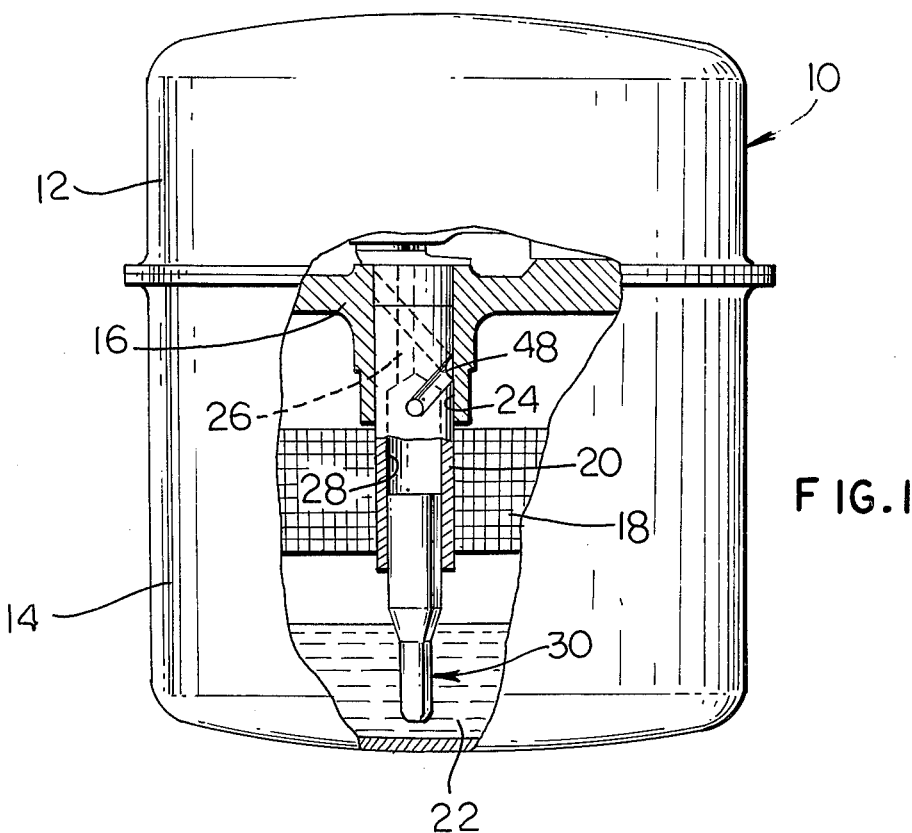
FIG. 1 is a schematic view, partly broken away, of a sealed motor compressor unit with which the pick-up tube of the present invention is used.

Referring to the drawings somewhat more in detail, the hermetic motor compressor unit 10 illustrated in FIG. 1 comprises an outer casing made up of parts 12 and 14 and within which the compressor and motor and lubricant and refrigerant supply are contained.

The unit mounted in the casing comprises a cast frame 16, the upper end of which embodies the compressor proper, which may be of a piston-cylinder type, while at the lower end, the cast frame embodies a motor having a rotor 18 connected to a shaft 20 which is the shaft through which power is supplied to the compressor.

At the bottom of the lower casing part 14 is liquid 22, consisting of refrigerant fluid and lubricating fluid. It is this fluid which it is desired to propel upwardly at least to bearing region 24 for shaft 20 and preferably on upwardly and out the upper end of the shaft at a region not illustrated via the bore 26 in the shaft which leads from the upper end of the bore 28 in the lower end of the shaft to the upper end of the shaft. Bore 26 is preferably offset laterally from the axis of shaft 20.

The pick-up tube 30 according to the present invention is press fitted in the lower end of shaft 20 and has a lower end portion dipping into the fluid 22 in the sump.

Figures 2, 3, 4:
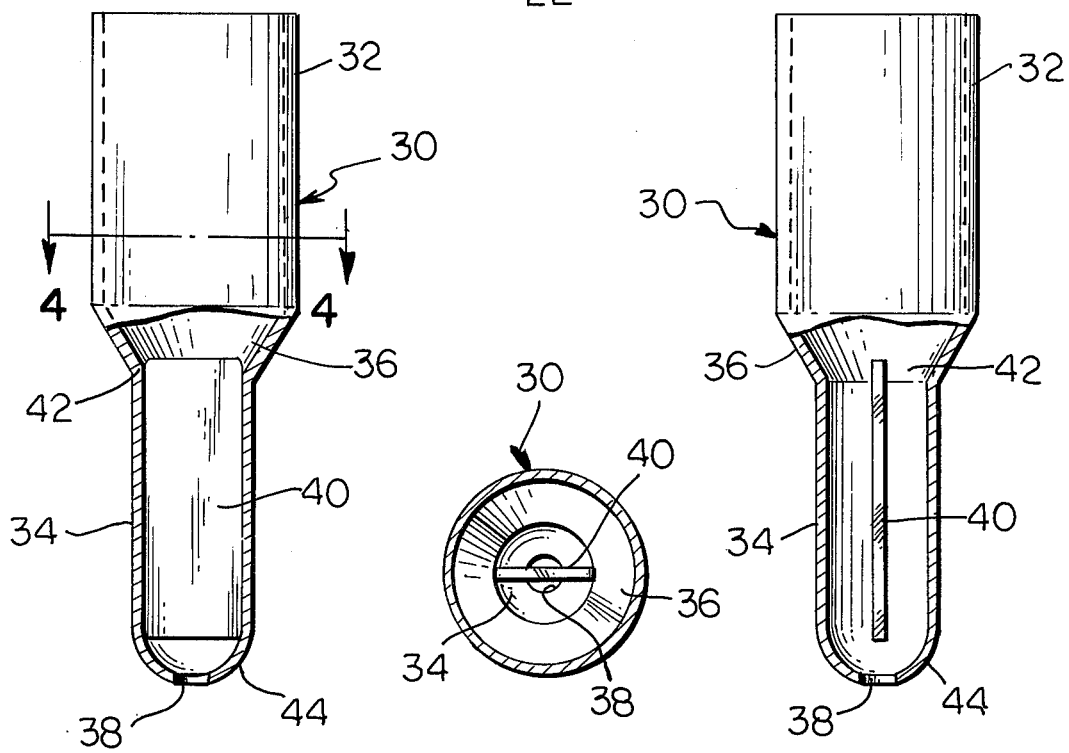
FIG. 2 is a side elevational view, partly broken away, showing the pick-up tube according to the present invention.
FIG. 3 is a view like FIG. 2 but looking in at another side of the tube.
FIG. 4 is a plan section indicated by line 4—4 on FIG. 2.

According to the present invention, the pick-up tube 30, shown more in detail in FIGS. 2, 3 and 4, has a cylindrical upper portion 32 of a larger diameter, a cylindrical lower portion 34 of a smaller diameter and a transistion region 36 tapering upwardly in the outer direction and connecting the first two mentioned portions. The upper end of the upper portion 32 is open, and the lower end of the lower portion 34 is provided with an inlet port 38 which is smaller in diameter than lower portion 34 and, of course, smaller in diameter than the open upper end of upper portion 32.

According to the present invention, a transversely extending baffle plate, or impeller member, 40 is mounted in lower portion 34, preferably by being lightly press fitted therein. Member 40, as will be seen in FIGS. 2 and 3, is a relatively thin plate, and at the lower end is disposed near inlet opening 38, while at the upper end extends to near or slightly above the axial region of the pick-up tube identified at 42 and which forms the juncture of lower portion 34 with transition portion 36. It will be noted that the lower end of lower portion 34 comprises an arcuate nose portion 44, and in which rounded or arcuate nose portion the inlet 38 is formed.

As will be seen in FIG. 1, the pick-up tube 30 is immersed in the liquid 22 in the sump so that the liquid is at least slightly above the aforementioned juncture between lower portion 34 of the pick-up tube and transition portion 36.

A pick-up tube of the nature referred to is especially adapted for use with hermetic motor compressor units of the nature generally referred to having motors ranging in horsepower from about one-twentieth up to about one-fourth. Such motors can operate at shaft speeds of, for example, 3,600 r.p.m., and the sump of the unit may contain an oil charge ranging from 13 ounces up to about 23 ounces.

A pick-up tube according to the present invention may have dimensions in conformity with the following schedule which is submitted by way of example and not by way of limitation:

|  | Inches |
| --- | --- |
| Overall length of tube 30 | 2.160 |
| Axial length of portion 32 | 1.03125 |
| Outside diameter of portion 32 | .560 |
| Inside diameter of portion 32 | .498 |
| Axial length of portion 34 | .750 |
| Outside diameter of portion 34 | .375 |
| Diameter of inlet port 38 | .171875 |
| Outside radius of nose portion 44 | .171875 |

Tube 30, when dimensioned as set forth above, has been found to avoid cavitation effects even at speeds up to 7,000 r.p.m. and in type 3G oil with a viscosity of 150 at temperatures up to 250° F. Generally speaking, the axial length of portion 32 will depend upon the distance between the lower end of the crankshaft 16 and the normal upper and lower limits of the oil level in the sump of the compressor and can be varied over a considerable range to accommodate such oil level variations.

However, the axial length of portion 34 should not be reduced much below three quarters of an inch. The outside diameter of lower portion 34 should not exceed about three-eighths of an inch for small units, but for other applications this dimension can be varied within limits determined by the diameter of the inlet port 38, the angular velocity of the shaft, the type of liquid in which the tube is submerged and spins, and the temperature and viscosity of the liquid as will be apparent to one skilled in the art from the disclosure herein.

Oil pick-up tube 30 may be mass produced economically in a progressive draw stamping operation from aluminum killed deep draw quality cold rolled steel. For example, to make a pick-up tube dimensioned as set forth above, sheet steel of 0.052 inch thickness is die blanked into a circular disc of 1.625 inches diameter. The flat disc is then progressively drawn first into a cup shape and then in three more draws into an elongated cylindrical tube of uniform diameter having a length of 1.75 inches (plus about a one-quarter inch holding margin at the open end) and an outside diameter of 0.560 inch.

In two more draws portions 34 and 36 are formed, during which draws the overall length of the drawn portion of the tube is increased to final dimension. Then the excess holding material is trimmed off the upper end of the tube, port 38 is pierced in the lower end of the tube, and then a final swaging operation is performed which brings the tube to an accurate finished size. Due to the cylindrical configuration of upper and lower portions 32 and 34 of the tube 30, the same is relatively economical to produce in a draw process as compared to a conical tube having the same overall length and the same inlet and outlet orifice diameters.

Plate 40 is adapted to be inserted endwise with a light press fit into the position shown in the drawings so as to extend diametrically across the bore of portion 34 and increase the output of the pump by reducing the slippage between the oil film and the inner surface of the tube, for example, by acting as an impeller vane in the tube, while also tending to break up Freon bubbles in a heavily laden Freon-oil mixture, thereby assisting the gas-liquid separating action which occurs within shaft 20 above tube 30.

When the compressor unit 10 is operating, tube 30 is spun at shaft speed and hence immediately upon the liquid entering aperture 38 rotational motion will be imparted to the liquid by the frictional drag exerted on the liquid by the inner wall of portion 34. The centrifugal force thus developed on the liquid produces, when the liquid is acting against the interior wall surfaces of the tube, an upwardly directed pressure on the oil in two stages, the first being in the immediate vicinity of aperture 38 due to the outward and upward inclination of the inner wall of nose portion 44, and the second being where the diameter of the tube again increases at the conical portion 36. The centrifugal force acting on the whirling oil is thus sufficient to pump a film of oil up the wall of tube 30 and bore 28 to the oil feeding passages 26 and groove 48 for distribution to the points of lubrication.

The body of fluid 22 surrounding the exterior surface of the submerged portions of tube 30 is also whirled by the skin friction of this surface on the adjacent fluid. However, due to the predetermined small diameter of portion 34 relative to portion 32, the surface speed of the external surface of portion 34 in the vicinity of inlet port 38 is slow enough to prevent cavitation of the liquid oil and refrigerant mixture in the vicinity of port 38. If any cavitation does occur, it will occur farther up tube 30, where it is sufficiently remote from port 38 to prevent interruption of oil feed through port 38.

It will be apparent that, in operation, the diametral baffle plate or impeller member 40 in the lower cylindrical portion 34 of tube 30 will provide a surface for engagement by the oil-refrigerant mixture substantially as soon as the mixture enters the lower end of the tube 30.

The baffle member thus exerts an immediate effect on the fluid to assist in the upward movement thereof along the tube 30 toward the tapering region of the tube and no decrease in rotational velocity of the fluid is encountered when measured inwardly from the inner periphery of the lower cylindrical portion of tube 30.

It will be understood, of course, that a further baffle member or impeller blade could be provided in the upper cylindrical portion of the tube as illustrated in prior U.S. Pat. No. 3,410,478. However, the impeller member in the lower cylindrical portion of the tube has proved to be highly effective and substantially to increase the fluid Pick-up as the tube rotates.

The substantially increased rate of fluid flow caused in the system by the pick-up tube, and which increase ranges from over 200 up to about 800 per cent, not only provides for more adequate lubrication of the regions to be lubricated, but also assists in the removal of heat from the device, especially from the rotor which is press fitted on the drive shaft.

Modifications may be made within the scope of the appended claims.

What is claimed is:

1. A pick-up tube, especially for use for supplying lubricant to lubricant passage means in a hermetic device which includes a fluid sump and a vertically disposed rotary shaft above the fluid level in the sump, said tube comprising: a larger diameter upper cylindrical portion open at the upper end and adapted for being fitted into a central bore in the shaft, said tube having a smaller diameter lower cylindrical portion adapted to be immersed in fluid in the sump and a tapering axial region connecting the upper and lower cylindrical portions, an inlet port extending axially into the lower end of said lower cylindrical portion, and an impeller blade disposed substantially diametrially inside said lower cylindrical portion.

2. A pick-up tube according to claim 1 in which said blade extends from near said inlet port to the axial region of said tube near the juncture of said lower cylindrical portion and said region.

* * * * *